Figure 1:
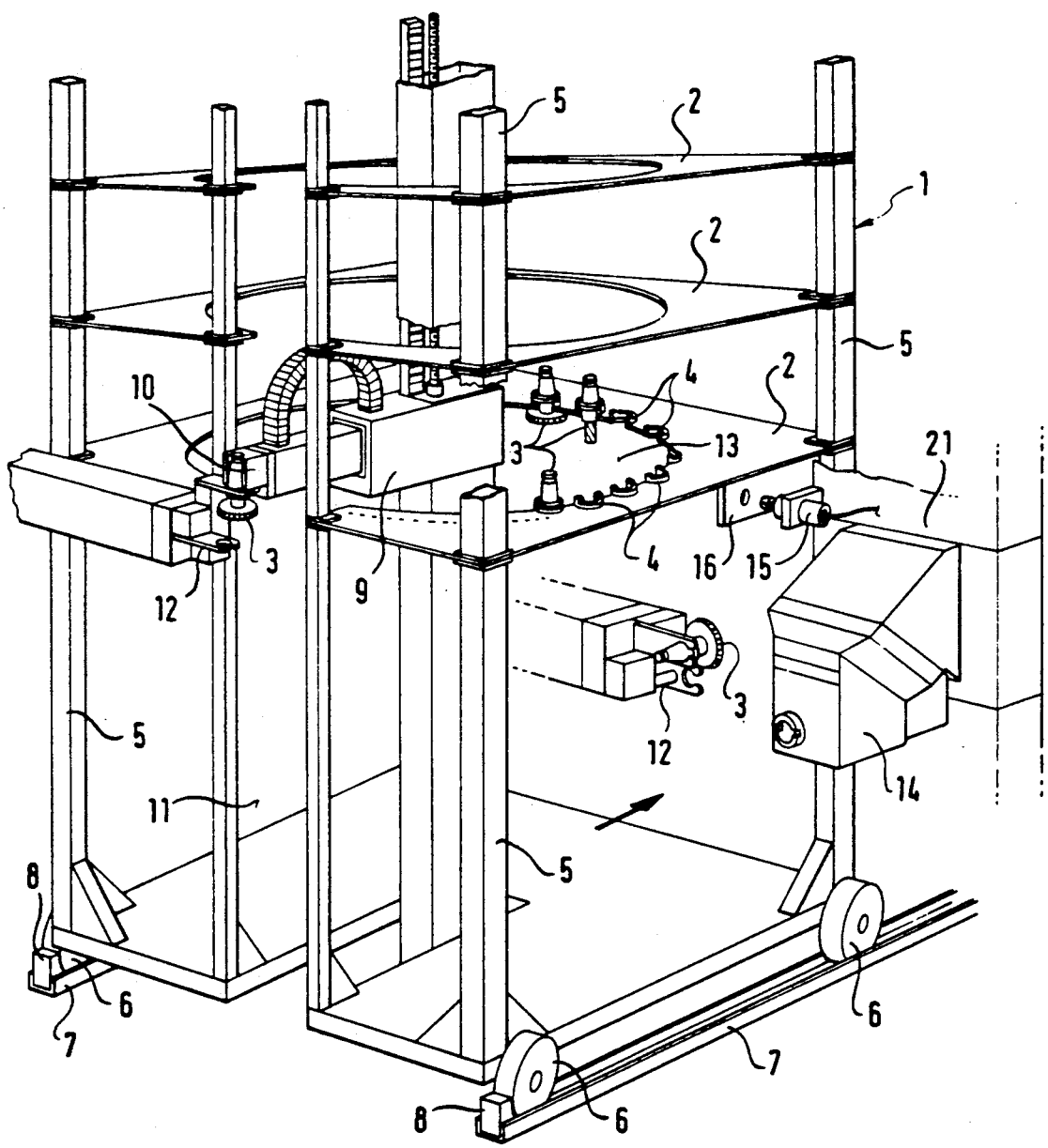

United States Patent [19]

Reuter et al.

[11] Patent Number: 5,107,581
[45] Date of Patent: Apr. 28, 1992

[54] TOOL MAGAZINE

[75] Inventors: Wolfgang Reuter, Wiehl; Kurt Kessler, Haar, both of Fed. Rep. of Germany

[73] Assignee: Wanderer Maschinen GmbH, Haar, Fed. Rep. of Germany

[21] Appl. No.: 280,462

[22] Filed: Dec. 6, 1988

[30] Foreign Application Priority Data

Dec. 11, 1987 [DE] Fed. Rep. of Germany ....... 3742096

[51] Int. Cl.$^5$ ............................................. B23Q 3/157
[52] U.S. Cl. ..................................... 29/568; 211/1.5
[58] Field of Search ................... 29/568, 264; 279/13, 279/155; 211/1.5

[56] References Cited

U.S. PATENT DOCUMENTS

| 3,339,273 | 9/1967 | Knosp | 29/568 |
|---|---|---|---|
| 3,932,924 | 1/1976 | Anderson | 29/568 |
| 4,344,221 | 8/1982 | Pagani | 29/568 |
| 4,359,815 | 11/1982 | Toyoda | 29/568 |
| 4,590,662 | 5/1986 | Norota | 29/568 |
| 4,644,636 | 2/1987 | Link et al. | 29/568 |
| 4,658,493 | 4/1987 | Saeki et al. | 29/568 |
| 4,701,994 | 10/1987 | Noh et al. | 29/568 |
| 4,866,835 | 9/1989 | Novak | 29/568 |

FOREIGN PATENT DOCUMENTS

| 1602895 | 6/1971 | Fed. Rep. of Germany . |
|---|---|---|
| 1602798 | 11/1971 | Fed. Rep. of Germany . |
| 2060957 | 5/1972 | Fed. Rep. of Germany . |
| 2140214 | 3/1973 | Fed. Rep. of Germany . |
| 2737225 | 2/1979 | Fed. Rep. of Germany . |
| 3026945 | 9/1981 | Fed. Rep. of Germany . |
| 3301314 | 8/1984 | Fed. Rep. of Germany . |
| 3416435 | 11/1985 | Fed. Rep. of Germany . |
| 3440604 | 5/1986 | Fed. Rep. of Germany . |
| 3532667 | 6/1987 | Fed. Rep. of Germany . |
| 86547 | 12/1971 | German Democratic Rep. . |
| 229950 | 11/1985 | German Democratic Rep. . |
| 250079 | 9/1987 | German Democratic Rep. . |
| 568130 | 9/1975 | Switzerland . |
| 623257 | 5/1981 | Switzerland . |
| 1595041 | 8/1981 | Switzerland . |

Primary Examiner—Z. R. Bilinsky
Attorney, Agent, or Firm—Townsend and Townsend

[57] ABSTRACT

A magazine is described which requires only a small surface area for its accommodation and which nevertheless holds a large number of tools. The magazine includes carrier units which are arranged in tower-like manner above one another and which are provided with a central cut-out and inwardly disposed tool mounts. This tower-like magazine is transportable and associated with a spatially fixed transport means which can be introduced into the central cut-out and which can transport the respective tools to a tool transfer position by short stroke and pivotal movements. Other magazine constructions are also described in the form of racks and towers.

6 Claims, 5 Drawing Sheets

TOOL MAGAZINE

The invention relates to a tool magazine comprising carrier units having a plurality of mounts for tools, sensing heads and the like, with the carrier units being arranged in a base carrier, and also a controllable tool transport means which includes a gripper device movable between the tool holders and at least one tool transfer position.

In a known tool magazine of this kind several carrier units for tools are provided which are fixable at both ends on a stable basic frame and which are individually interchangeable using suitably adapted transport carriages. A kind of portal robot is associated with these carrier units which are arranged in a defined manner alongside one another, with the portal robot spanning the full horizontal field of carrier units and with the tools arranged in the various carrier units being removable or returnable by means of the portal robot. A tool magazine of this kind is not only complex from a constructional viewpoint but has also a considerable space requirement which is frequently not available in practice, and which must frequently first be provided by expensive measures. In addition to the considerable complexity and cost associated with this known system comes the fact that the tool change times which can be achieved leave something to be desired as a result of the long paths of movement. The interchange of the individual carrier units also takes a lot of time.

The object underlying the invention is thus to provide a tool magazine of the initially named kind which despite small space requirement and constructional simplicity makes it possible to minimise both the tool change times and also the change times for the total magazine, and indeed practically independently of the number of tools which are to be accommodated in the tool magazine.

This object is satisfied in accordance with a first embodiment of the invention essentially in that the carrier units are arranged alongside and/or above one another while forming a tiered vertical rack structure in the base carrier and the tools are held suspended in the mounts; and in that the gripper device is freely movable parallel to the plane of the base carrier and is movable perpendicular to the plane of the base carrier for the removal and return of tools.

By providing a tool magazine of a rack-like structure it is possible to store a large number of tools in the area which is in practice always available. Moreover, it is possible to move towards the individual storage positions by means of an uncomplicated tool transport means and to rapidly carry out a transfer of the respective tool between the tool mount and a tool change position by the shortest path, and thus correspondingly quickly.

The base carrier preferably consists of a closed frame with horizontal and vertical struts in which the carrier units are accurately fixable in position and are interchangeable in module-like manner.

It is also possible to make the entire carrier unit interchangeable and for this purpose to hold the frame-like base carrier with its horizontal frame parts in guides. In this manner all of the tools incorporated in the base carrier can be interchanged in dependence on the particular machining task simply by pulling the base carrier out of its guides and transferring it, for example in corresponding guides, onto a transport carriage. Another base carrier with new or other tools can then be brought into the guides associated with the machine tool by the transport carriage, with the new base carrier again being fixed accurately in position in the guides, so that the transport means can again move exactly in a defined manner to the individual tool mount positions.

A particularly large number of tools can be stored in conjunction with a single transport means in the magazine when two parallel base carriers equipped with carrier units are provided and the transport means is movable between these two base carriers in a plane parallel to the latter, with a double arm gripper or at least a gripper pivotable through at least 180° being provided as the gripper device. In this way it is possible for the same transport means to move up to the carrier units of both base carriers, and depending on the particular case, to serve a tool mount in one or other base carrier via the gripping device.

In accordance with a particularly simple, stable and simultaneously flexible embodiment of the invention a C-shaped carrier is provided as the base unit, with the transport means being directly coupled or fixedly connected with the latter via the horizontal limbs. The relative position of the base carrier and of the transport means is thus uniquely predetermined and above all no independent carrier construction is necessary for the transport means, since this function is taken on by the base carrier.

Tool carrier cassettes are horizontally displaceably journalled and positioned in the horizontal guide rails so that the carrier frame can be equipped depending on the particular requirements. The equipment of this specially constructed base unit can take place quite simply via a lifting carriage which is equipped with corresponding guides and which permits mutual alignment of the guides in the base carrier with the respective guide on the lifting carriage by a lifting or lowering process.

If corresponding racks with corresponding guides are then provided in a central store then a space saving and problemfree storage of the carrier cassettes in the central store is possible. Moreover, transport between the central store and the base carrier is made possible in a particularly simple and uncomplicated manner via a corresponding transport carriage.

The carrier cassettes can be bent up particularly economically from continuous sheet metal with the accuracy required being achievable without problems. The mounting of a drop protection tray or catch tray beneath the tool mounts ensures that no contamination occurs at the tool mounts which are arranged above one another.

It is of particular advantage to integrate a tool testing station into the rack structure so that a tool control, in particular a breakage control can be carried ou in the tool magazine. The machine tool itself does not therefore any longer have to travel to a test station, whereby operating time is saved. Since the testing station is also no longer located in the working any form of contamination problem of the sensors that are required is overcome. The test procedure itself is carried out in such a manner that the transport means which transfers the respective tool from the tool transfer region to its magazine location moves in a defined manner past appropriate sensors of the testing station, with the with the required measurement being out thereby. The tool magazine has a defined and fixedly positioned tool checking station integrated into the rack structure, in particular in the tool transfer region, with at least the length of the respective tool being determinable by means of stationary sensors during the movement past the tool testing station by way of the transport means.

In accordance with another embodiment of the invention, the tool magazine has a charging station for charging accumulators, in particular, a fixedly positioned charging station integrated in the rack structure for receiving measurement or test devices. Suitable test devices include a measurement sensor which is equipped with accumulators for supplying current to the sensor, and such measurement or test devices are coupled with an electric charging circuit when held in the mounts 4.

In accordance with an advantageous embodiment or the invention predeterminable region of the base carrier is to receive carrier units for worne tools or tools which are are to be inserted or extracted. This region is expediently located at the end of the tool magazine remote from the machine tool so that it is also manually accessible. With this arrangement a tool carrier for the worn tools is expediently arranged in the lower corner region and above this tool carrier there is located a second tool carrier for tools that are to be inserted and above this again there is provided a tool carrier for the tools which are to be extracted. The sorting of tools into and out of the above tool carriers takes place with the transport means which also serves to handle the tools between the magazine locations and the tool changer associated with the machine tool. For the period of the insertion an extraction of tools which can also be carried out manually, this special region of the tool magazine is blocked off by protective devices.

In order to permit an automisation of the process of loading and unloading these special tool carriers these three tool carriers which are arranged above one another can be made insertable and extractable or inwardly and outwardly pivotable as a rack part.

A second solution of the underlying object is to be found in the provision of a tool magazine comprising several carrier units equipable with tools, with the carrier units being positionable and fixable relative to one another and relative to a controllable transport means for the tools, with the transport means including at least one gripper device movable between the tool mounts and at least one tool transfer position, characterised in that the carrier units are of ring disk-like construction and are stacked mutually spaced apart coaxially on a common axis of rotation; in that the tools are held radially in the mounts and are transportable individually by means of a linearly translatable unit into a transfer position disposed at a larger radius, and also transportable by the latter back into the mounts; and in that the gripper device is movable parallel to a generatrix of the stack formed by several carrier units between the transfer positions which are disposed on a straight line and which are respectively associated with one carrier unit.

This solution is also characterised by its particular compactness and by the possibility of storing a large number of tools. Furthermore a magazine which is constructed in this manner can be manufactured at favourable cost and can also be correspondingly rapidly interchanged in dependence on the prevailing requirements. A third solution of the underlying object lies in the provision of a tool magazine comprising a plurality of carrier units which can be equipped with tools and which are positionable and fixable relative to one another and relative to a controllable transport means for the tools, with the transport means including at least one gripper device movable between the tool mounts and at least one tool transfer position, characterised in that the carrier units for the tools are formed as horizontal carriers disposed above one another and parallel to one another at a predetermined mutual spacing, with the horizontal carriers having a central cut-out and inwardly disposed tool mounts and being held in a transportable base carrier; and in that the transport means which executes linear movements and rotary movements is spatially fixedly positioned within the central cut-outs.

The tower-like construction of the magazine which is movable as a whole and the central arrangement of the transport means, which can preferably be built up in simple manner from known linear modules and rotary modules, makes it possible to store a plurality of tools in the individual horizontal carriers with a very small positioning surface (floor space requirement). This floor space is in practice always available. It is possible to select the number of horizontal carriers that are used in accordance with the required maximum number of the tools that are required.

It is however not only the time required for changing the base carrier or base frame and thus of the total tool magazine which is small. In addition unusually short tool change times can also be achieved with the magazine in accordance with the various embodiments of the invention, since the gripper device can in each case move on the shortest possible path between the particular tool mounts which are to be approached and a defined tool transfer position.

It is furthermore of particular advantage in conjunction with all the variants of the invention that the individual carrier units can each be so constructed that they can be inserted in drawer-like manner into the respectively associated base carrier and can be accurately fixed in position in the base carrier. In this manner the magazine can be rapidly adapted in problemfree manner to the particular requirements having regard to the number of the tools which are to be accommodated. Moreover, it is possible to separately and rapidly interchange individual modules associated with specific regions of the total magazine. Specific tool kinds can be gathered together in such individual modules, for example tool kinds which have a shorter period of residence in the total magazine than the remaining tools and which must therefore be more frequently interchanged.

The vertical, mutually aligned tool mounts of the individual carrier units are provided with mounts and positioning elements which preferably consist of synthetic plastic material, which ensure a vertical mounting of the tools and which prevent possible tool wear arising during the tool changing procedures. These mounts and positioning elements can consist of horseshoe-like plastic parts which can be snapped onto a cut-out, in particular a semi-circular cut-out of the edge region of each mount, they are thus also interchangeable.

As a result of the short tool change times which can be achieved by means of the tool magazine in accordance with the invention it is in principle also possible to serve two adjacent machine tools with tools from this tool magazine. This can take place both by means of a single change position which can be approached both by the transport means and by a tool changer, and also by using two change positions which are respectively placed on ideal positions for the two machines, since the choice of the particular change positions has practically no influence on the tool change times.

The rack-like, tower-like or drum-like tool magazine of the invention are also suitable for the storage of tools in the actual tool store and it is also possible without difficulty, as a result of the basic concept of this tool magazine, to effect automatic filling of the particular magazine. A transport means is suitable for this purpose which is constructed analogously to the transport means which is directly used in the machine tool.

Figure 2:
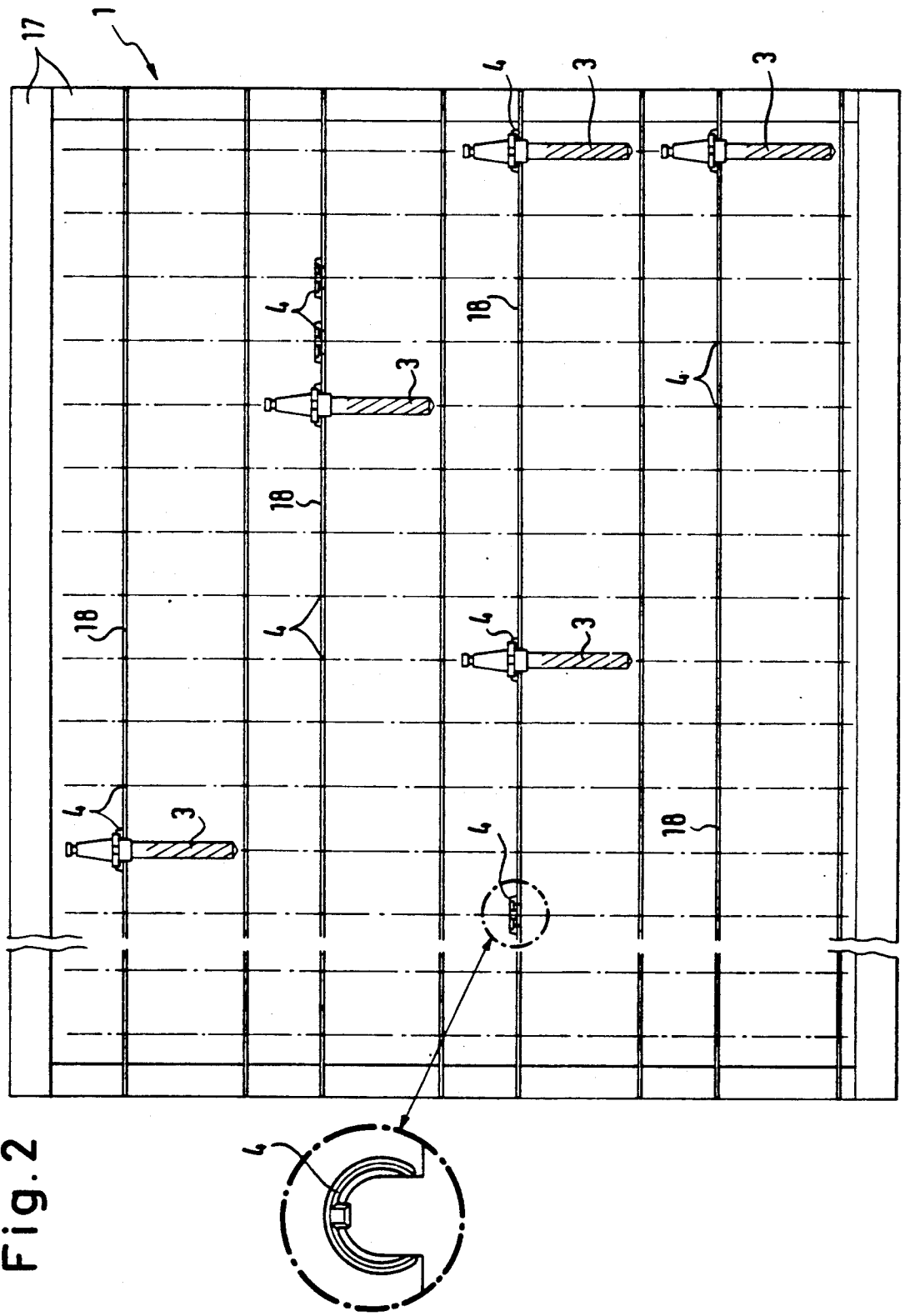
Figure 3:
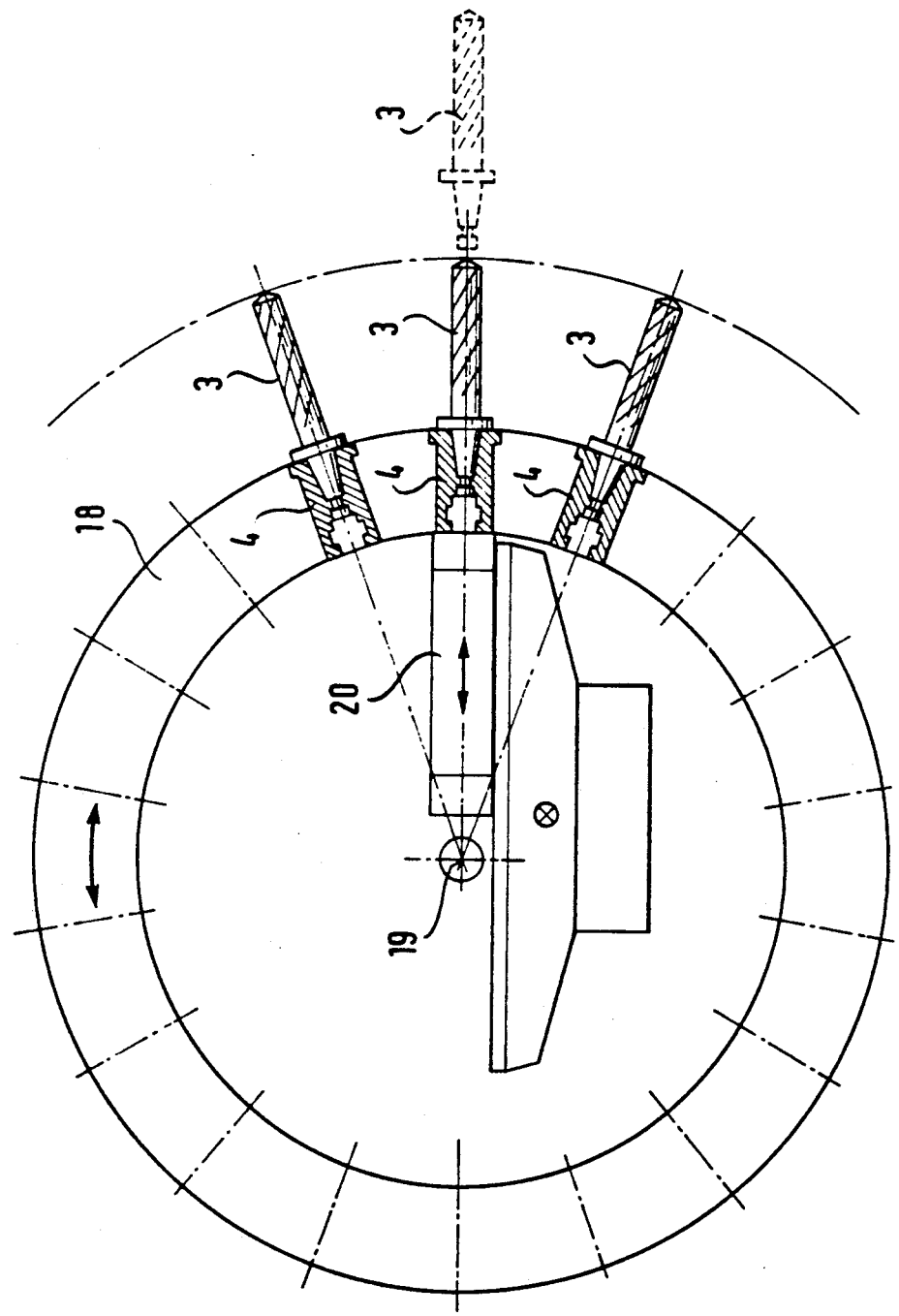
Figure 4:
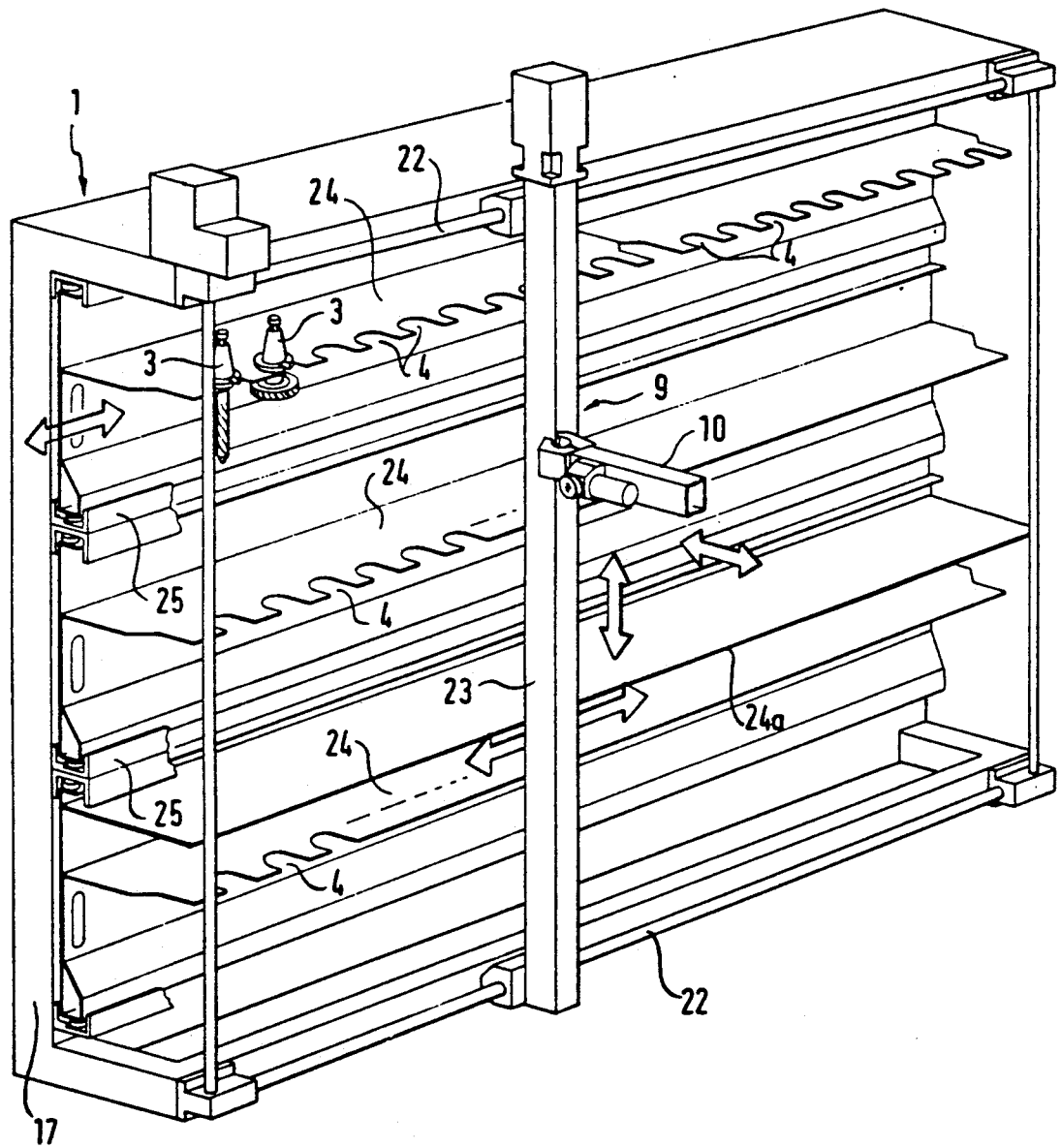
Figure 5:
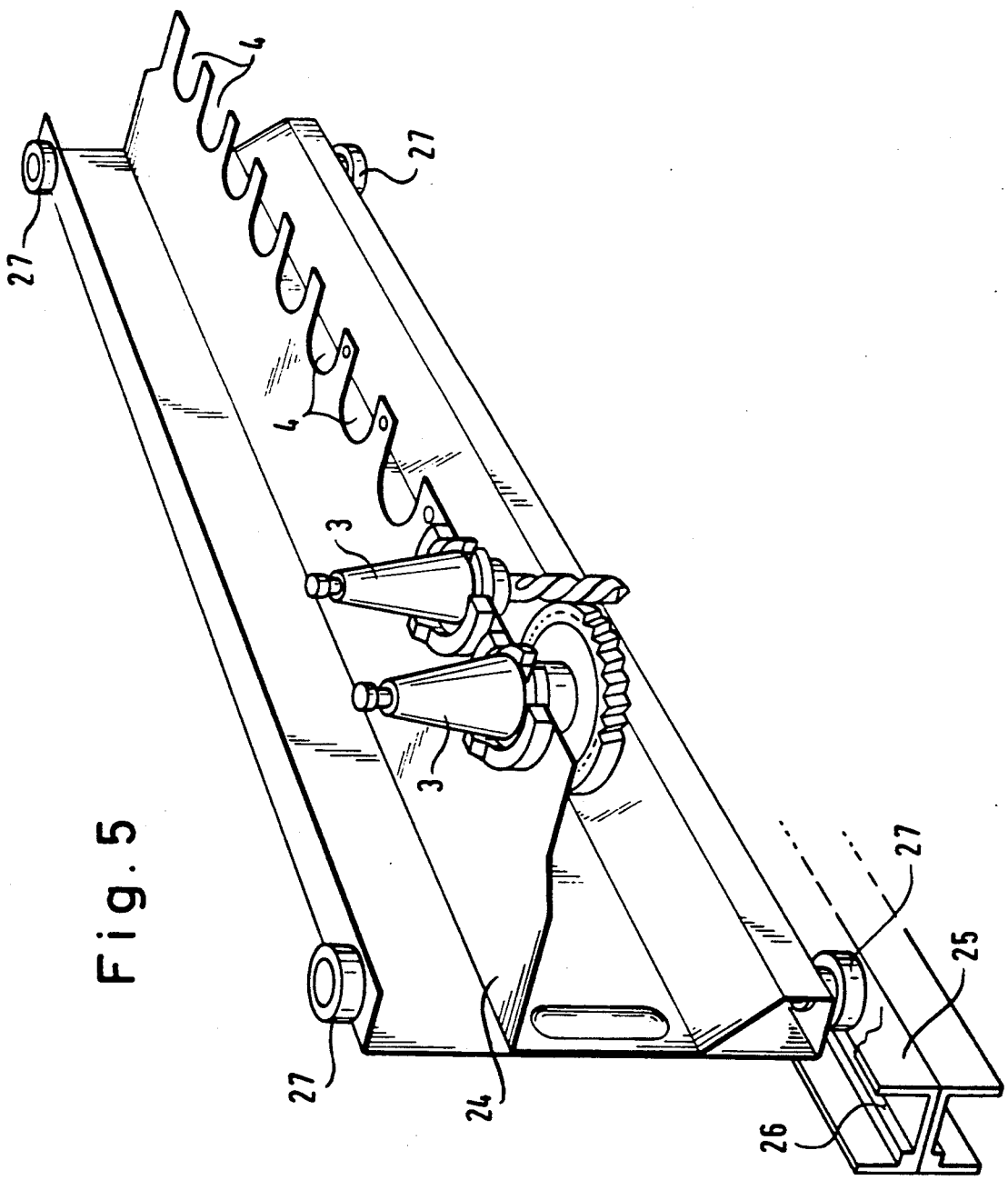

Embodiments of the invention will now be explained in more detail with reference to the drawing which shows:

FIG. 1 a schematic perspective partial illustration of a machine tool magazine of tower-like construction in accordance with a variant of the invention, FIG. 2 a schematic front illustration of a machine tool magazine in accordance with the invention of rack-like construction, FIG. 3 a schematic representation of a further embodiment of a tool magazine in accordance with the invention in a drum-like embodiment, FIG. 4 a schematic perspective illustration of a further variant of a tool magazine of the kind shown in FIG. 2, and FIG. 5 a schematic perspective illustration of a tool carrier cassette for use in the magazines of FIGS. 2 and 4.

FIG. 1 shows a base carrier characterised with the general reference numeral 1 having the form of a basic frame in which several horizontal carriers 2 are accurately fixed in position above one another in tower-like manner. The mutual spacing between the individual horizontal carriers 2 is so selected that the individual tools 3 can be inserted without problem into their associated holders 4 and can be removed from the latter.

The basic frame 1 includes stable corner posts 5 to which the horizontal carriers 2 are secured. The basic frame 1, which is as a whole extremely stable and torsionally stiff, is obtained through the cooperation of the corner posts 5, of the horizontal carriers 2 and eventual further connection elements.

This basic frame 1 is provided with wheels or rollers 6 which make is possible to transport the basic frame equipped with the tools without problem and which are guided in the region of the working position of the magazine adjacent to the machine tools (e.g. 21) in rails 9 so that precise positional fixation of the basic frame is possible via suitable abutments 8 and position controls. A transport device 9 of fixed position is arranged centrally in the inner region of the tower-like basic frame 1. This transport device 9 which represents a handling robot consists preferably of known linear and rotary elements which can be put together at a favourable cost. These linear and rotary elements make it possible to move a gripper arrangement 10 along short paths of travel between any desired tool mounts 4 within the tower-like basic frame, and to a defined tool transfer position. That is to say the gripper arrangement can comprise a horizontal unit which can be moved vertically to any desired horizontal carrier 2 and can be rotated about a vertical axis to reach any desired tool position. The horizontal unit can then be extended or retracted so that the gripper arrangement 10 grasps a tool or releases a tool for removal or replacement thereof in the horizontal carrier.

In the illustrated embodiment the basic frame 1 is provided with a slot-like vertical opening 11 and the horizontal carriers 2 likewise have a cut-out aligned with this opening 11 so that the basic frame 1 can be moved in accordance with the direction indicated by the arrow relative to the transport means 9, i.e. the transport means 9 can be introduced into the center of the basic frame 1, and so that the horizontal unit of the transport means 9 can be moved along this vertical opening and can move towards a defined tool transfer position disposed outside of the frame. This tool transfer position is also approachable by means of a tool changer 12 which serves a working spindle 14 of a machine tool. The tool changer which is preferably used in conjunction with the tool magazine of the invention is described in detail in the patent application P 37 33 064.0.

The base carrier or basic frame 1 is preferably connectable, as in all embodiments of the invention, by means of a fixing and coupling means in the form of a coupling plate 16 and a coupling cylinder 15 with a component 21 of the associated machine tool, so that the base carrier or basic frame 1 can be moved with the machine during a machining movement of the machine and in this manner the base carrier can be brought as a whole into a tool change position without special drives and the like being necessary for this purpose.

The vertical spacings of the tool mounts which are preferably mutually aligned in the vertical direction in all embodiments are matched to the tool lengths which are encountered in practice and can thus be selected differently in order to obtain an ideal packing density of the tools to be stored in the magazine.

FIG. 2 shows a preferred embodiment of the invention in accordance with which the tool magazine has a rack-like structure, so that a plurality of individual tools can be arranged alongside one another and above one another in a vertical plane and so that a transport means movable in the horizontal and vertical direction can move a gripper device in a plane parallel to the vertical plane. The gripper device then only has to execute a stroke movement perpendicular to the plane of the rack in order to grasp the respective tool 3 and remove it or replace it.

The base carrier 1 of this arrangement preferably consists of a stable closed frame 17 (rectangular frame) with carrier units 18 being fixed or interchangeably arranged therein. Each of the carrier units 18 is provided with a plurality of tool mounts 4 which, as shown separately, correspond to the tool mounts 4 already explained with reference to FIG. 1.

The total rack structure can be built-up of individual part structures in order to simply adapt the total storage capacity of the magazine to the prevailing requirements.

The variability in construction of this vertical rack structure ensures that all the relevant conditions which occur in practice can be taken into account, and indeed for example through the interchangeability of individual modules or planes which can in particular also be of different construction.

A high storage capacity is obtained when two base carriers are arranged parallel to one another, with a comparatively small mutual spacing and when a single transport device is movably arranged between the base carrier planes. The gripper device can be executed as a double arm gripper or as a normal single arm gripper in conjunction with a rotary unit.

As already described in connection with the embodiment of FIG. 1 the rack-like base carrier can also be interchanged as a total unit, for which purpose the upper and lower horizontal limbs of the frame are expediently held and positioned in suitable guides, in particular in roller guides, so that this frame can be drawn out of its guide and can be transferred into a corresponding guide on a transport carriage. Following this a base carrier equipped with new tools or other tools can at once be inserted.

In the embodiment of FIG. 3 the carrier units 18 are of ring disk shape and are secured mutually spaced apart coaxially on a common axis of rotation 19. A plurality of mounts 4 for tools 3 is provided over the periphery of each ring disk for which purpose the axes of the mounts and thus of the tools extend radially. The tools 3 are fixed in the inserted state in the mounts 4 so that they cannot change their position during rotary movement of the carrier units.

By means of a linearly movable unit 20, which is respectively associated with a carrier unit 18, it is possible for the tool 3 which is aligned with this unit 20 to be released from the tool mount 4 and moved radially outwardly into a transfer position where it can be grasped by a gripper device. The tool 3 shown in dashed lines in FIG. 3 is in such a transfer position. In corresponding manner a tool offered by a gripper device can be transferred into the mount 4.

The gripper device is movable during this procedure in a straight line which extends parallel to a generatrix of the cylindrical stack of carrier units.

This embodiment of the magazine also ensures that a large number of tools can be housed in a space which is as small as possible and that very short tool change times are obtained. Whereas in the embodiments of FIGS. 1 and 2 the individual tool mounts are stationary and are approached by the transport means, the tool mounts in the embodiment of FIG. 3 are rotatable about the axis 19 in order to bring the tool mount which is addressed in a particular case into alignment with the spatially fixed linear unit 20, so that the latter can bring the respective tool into the transfer position.

FIG. 4 shows a schematic perspective illustration of a variant of the magazine of FIG. 2. Here the base carrier 1 has the shape of a C-shaped frame with the transport means 9 being secured to the horizontally extending limbs so that no special carrier unit is required from these transport means 9. The transport means 9 consists of upper and lower horizontal guides 22 and also of a vertical guide 23 arranged between them to which the movable gripper device 10 is attached. The possibilities of movement are indicated by arrows. U-shaped cassette guides 25 can for example be secured to the vertical frame parts 17 and serve to accommodate tool carrier cassettes 24. These tool carrier cassettes 24 are supported relative to the guides 25 via rolling elements, rollers, ball pots and the like and are preferably also adjustable via these elements. These tool carrier cassettes 24 can be horizontally displaced in the guides 25 and brought into the respectively preset positions where they latch into corresponding mounts, in particular resiliently constructed mounts, from which they can also be readily released again. The mounting of a drop protection tray or catch tray 24a beneath the tool mounts ensures that no contamination occurs at the carrier cassettes 24 which are arranged above one another.

FIG. 5 shows a particularly advantageous embodiment of a tool carrier cassette 24 which is bent up from an endless, i.e. continuous sheet of metal. Through the folding process one obtains a C-shaped structure with support or guide rollers 27 being journalled at the two outer limbs with an adjustment of the cassette relative to the associated guide also being possible via these support or guide rollers. Through the backwardly bent parts and the double wall construction of the central region of the cassette one obtains a very stable and torsionally stiff construction. The tool mounts 4 are formed in a horizontally extending free end section of the continuous sheet of metal, which is disposed approximately centrally or in the top third of the C-structure.

A support shoulder 26 is formed in the cassette guide 25 for the rollers 27 of the carrier cassette 24. However, it should be pointed out that a plurality of other embodiments can in principle be used with respect to the supporting and guidance of the cassette relative to the carrier guides, and that ball pots can in particular also be used for this purpose.

In the practical use of the various embodiments of the machine tools in accordance with the invention it is of advantage that the equipping of the respective magazine can take place remote from the machine tool and that the equipped magazine as a whole can then be brought into the working position. I.e. the magazine can be fixed accurately in position relative to the transport means so that the programmed transport means can remove the tools that are required in any particular case by stroke and pivotal movements and can bring them into the tool transfer position. The tools are then brought to the associated working spindle 14 by means of a tool changer. The changing of the magazine can always be executed within a short period of time so that a large number of new tools or different tools is then available again at once. In this way the machine equipping times can be minimised.

I claim:

1. A tool magazine comprising:
carrier units having means for holding tools in a substantially vertical position;
a first base carrier;
means for supporting the carrier units on the base carrier in a tiered vertical rack structure; and
a controllable transport means comprising a gripper device movable between the means for holding a transfer position of the removal and return of tools;
wherein the means for supporting the carrier units comprises a C-shaped frame having substantially horizontal limbs and a substantially vertical limb, the transport means being displaceably mounted on the horizontal limbs, the frame having guides for holding the carrier units.

2. The tool magazine of claim 1 wherein the carrier units comprise carrier cassettes, each cassette comprising a bent continuous piece of sheet of metal forming a vertical wall having a cantilevered wall extending horizontally in the center of the cassette for holding tools, the tool magazine further comprising a catch tray for catching tools, said catch tray being disposed beneath the means for holding tools.

3. The tool magazine of claim 2 further comprising means for movably supporting the carrier cassettes in the guides.

4. A tool magazine comprising:
carrier units having means for holding tools in a substantially vertical position;
a first base carrier;
means for supporting the carrier units on the base carrier in a tiered vertical rack structure; and
a controllable transport means comprising a gripper device movable between the means for holding a transfer position of the removal and return of tools;

wherein the means for holding comprises holding and positioning elements formed from plastic in a horseshoe shape, the holding and positioning elements being removably attachable to the carrier unit.

5. A tool magazine comprising:

carrier units comprising carrier cassettes, each cassette comprising a bent continuous piece of sheet metal forming a vertical wall having a cantilevered wall extending substantially horizontally in the center of the cassette for holding tools in a substantially vertical position;

a base carrier;

means for supporting the carrier unit comprising a C-shaped frame having substantially horizontal limbs and a substantially vertical limb; and a controllable transport means displaceably mounted on the horizontal limbs, the transport means comprising a clipper device movable between the means for holding and a transfer position of the removal and return of tools.

6. The tool magazine of claim 5 wherein the frame has guides for holding the carrier units, the tool magazine further comprising means for movably supporting the carrier cassettes in the guides.

* * * * *

UNITED STATES PATENT AND TRADEMARK OFFICE
CERTIFICATE OF CORRECTION

PATENT NO. : 5,107,581
DATED : April 28, 1992
INVENTOR(S) : KESSLER, Kurt

It is certified that error appears in the above-identified patent and that said Letters Patent is hereby corrected as shown below:

On the Title page, item [19], immediately below

"United States Patent", delete "Reuter et al." and substitute therefor -- Kessler --, and under item (75)

delete "Wolfgang Reuter, Wiehl;" and the word "both".

Signed and Sealed this

Twentieth Day of July, 1993

Attest:

MICHAEL K. KIRK

Attesting Officer

Acting Commissioner of Patents and Trademarks